Figure 1:
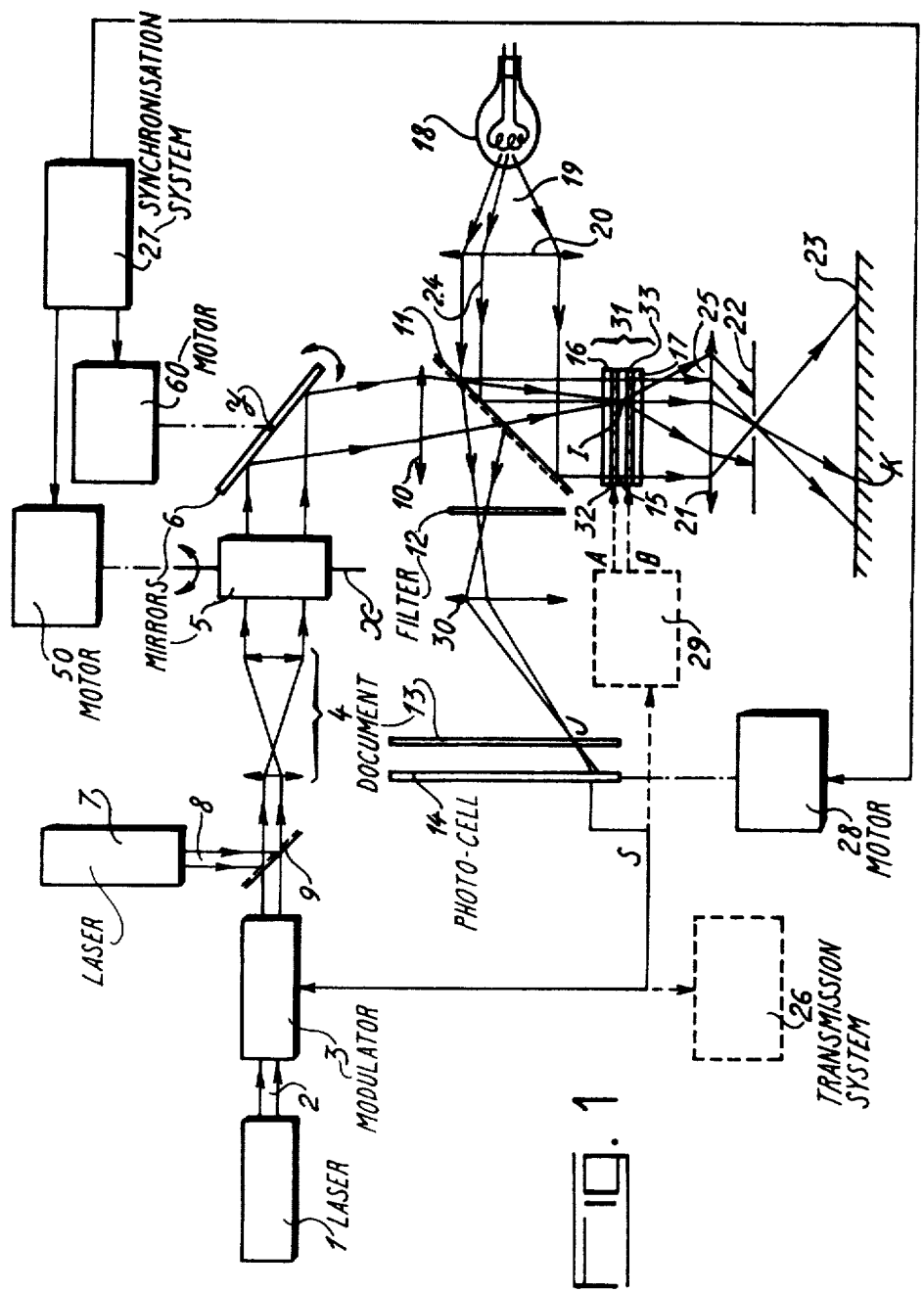

United States Patent [19]

Hareng et al.

[11] 4,288,822
[45] Sep. 8, 1981

[54] SYSTEM FOR THE ANALYSIS AND THE RECORDING OF MONOCHROMIC IMAGES

[75] Inventors: Michel Hareng; Serge Le Berre; Pierre Leclerc, all of Paris, France

[73] Assignee: Thomson-CSF, Paris, France

[21] Appl. No.: 132,643

[22] Filed: Mar. 21, 1980

Related U.S. Application Data

[63] Continuation of Ser. No. 943,819, Sep. 19, 1978, abandoned.

[30] Foreign Application Priority Data

Sep. 23, 1977 [FR] France ............... 77 28739

[51] Int. Cl.³ .............................. H09N 1/22
[52] U.S. Cl. ..................... 358/296; 346/76 L; 346/108; 365/108; 350/330; 350/350 S
[58] Field of Search ............... 350/350 S, 330; 346/76 L, 108; 358/296, 127, 236; 365/215, 234, 108

[56] References Cited

U.S. PATENT DOCUMENTS

| | | | |
|---|---|---|---|
| 3,465,352 | 9/1964 | Carlson | 346/76 L |
| 3,627,408 | 12/1971 | Fergason | 365/108 |
| 3,796,499 | 3/1974 | Kahn | 346/76 L |
| 4,002,829 | 1/1977 | Hutchinson | 346/76 L |
| 4,040,047 | 8/1977 | Hareng et al. | 365/108 |

FOREIGN PATENT DOCUMENTS 2275087 1/1976 France ............... 358/296
2299660 8/1976 France ............... 358/300

OTHER PUBLICATIONS

"Projecting Images with Liquid Crystals" by Anderson, Bell Lab Record, Jul./Aug. 1974, vol. 57, No. 7.
Computer Design, Dec. 1972, p. 28.
"Ir-laser-addressed Thermooptic Liquid-Crystal Storage Displays" Appl. Phys. Lett., vol. 22, No. 3, Feb. 1973, pp. 111-113 by Kahn.

Primary Examiner—Alan Faber
Attorney, Agent, or Firm—Cushman, Darby & Cushman

[57] ABSTRACT

A system comprising means for emitting an analysis beam and a recording beam, the two beams being deflected by common deflection means. The analysis beam scans the document carrying the image to be analyzed and a detecting photocell provides an electrical signal. The recording beam scans a liquid crystal cell, where it records the image in synchronism with analysis in dependence upon a modulation of the thermo-optical effects induced in the liquid crystal. This modulation is provided by the electrical signal.

6 Claims, 2 Drawing Figures

SYSTEM FOR THE ANALYSIS AND THE RECORDING OF MONOCHROMIC IMAGES

This is a continuation, of application Ser. No. 943,819 filed Sept. 19, 1978, now abandoned.

This invention relates to apparatus for reproducing monochromic images using the thermo-optical effects in liquid crystals by means of which it is possible to store information, writing being effected by a laser beam. The liquid crystals may be in the smectic phase or in the cholesteric phase.

It is already known that the thermo-optical effect can be used in a thin layer of a material having a smectic phase for recording a black-and-white image thereon. In an Article in "Applied Physics Letters" of Feb. 1, 1973, F. J. Kahn shows how it is possible to produce a system for recording, storage and display of images by an intensity-modulated infrared laser. Irradiation, i.e. heating, of the smectic phase brings it into the isotropic liquid phase. In the writing phase, rapid cooling renders the disorder permanent. In the erasing phase, slow cooling is applied to return the crystal to its homeotropic state. Similar results are obtained with cholesteric liquid crystals. In a U.S. Pat. No. 4,040,047 entitled "Erasable" thermo-optic storage display of a trasmitted image, HARENG et al show that the use of certain smectic substances enables half-tones to be obtained by applying the signal to be recorded between two electrodes surrounding the layer.

Irrespective of the materials used, a thermo-optic storage system generally comprises a laser source of which the beam is deflected by two deflectors and focussed on the layer of thermosensitive material. The deflectors enable any point of the layer to be addressed by the laser beam. For display purposes, a projection system illuminates the layer for detecting therein the modifications produced by the heating effect of the laser beam. The signal corresponding to the information to be recorded may modulate the incident laser beam or may even be applied between two electrodes surrounding the layer of liquid crystal, as indicated above. This information may be an item of digital information, for example emanating from a computer, or an item of digital or analog information characterising the image of a document which it is desired to reproduce. In this case, the image is analyzed either beforehand or simultaneously to provide the video signal by means of a television camera or a laser forming part of an independent system, the document to be analyzed generally being placed on a rotating drum.

According to the present invention, there is provided a system for reproducing monochromic images carried by a support in a thermosensitive cell comprising a liquid crystal layer, said system comprising optical means for producing an analysing light spot on said support and a recording light spot in said liquid crystal cell, deflecting means for the scanning of said support by said analyzing spot and the synchronous scanning of said liquid crystal cell by said recording spot, photodetective means collecting the light emerging from said support and providing an electrical signal representative of said images for modulating the thermo optical effects induced in said layer by said recording spot.

Figure 2:
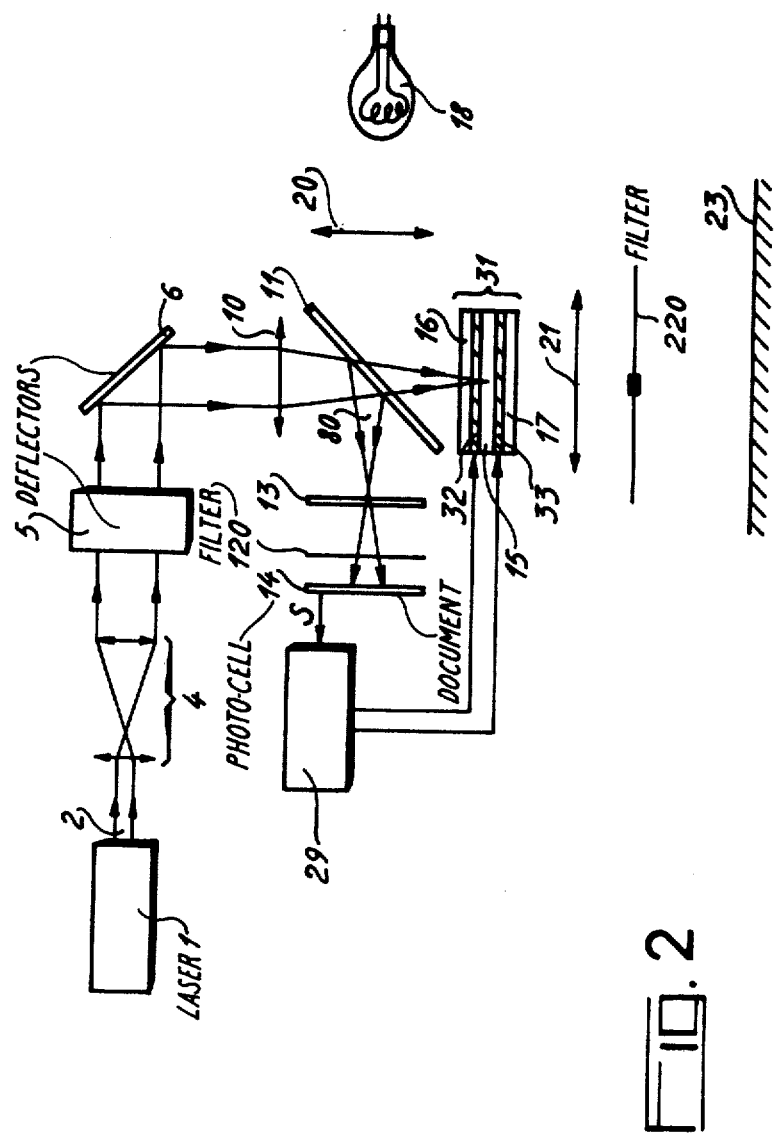

Other features and advantages of the invention will become apparent from the following description given by way of non-limiting example in conjunction with the accompanying drawings, wherein:

FIG. 1 shows one embodiment of the invention.
FIG. 2 shows one variant of the invention.

Referring to FIG. 1, illustrated therein is a typical embodiment of a system for analyzing and simultaneously displaying images. This system is intended for the analysis of a document 13 having a spatially variable transparency to visible radiation and for its simultaneous recording in a cell 31 by thermal effects, the image thus reproduced being able to be projected onto a surface 23 or to be tele-transmitted by a transmission system 26. A pulsed recording beam 2 coming from a laser source 1 (for example a YAG laser having an output of 300 mW and a wavelength $\lambda_1$ of 1.06 $\mu$m) and an analysis beam 8 coming from a laser source 7 (for example a He Ne laser having an output of 1 mW and a wave-length $\lambda_2$ of 0.63 $\mu$m) are emitted to follow the same optical path. To this end, the beam 8 is reflected by a semi-reflecting or dichroic plate 9 where the beam 2 passes through this plate. Disposed in the common path of the two beams are an expander 4 which enables their diameter to be increased with a view to subsequently reducing the diffraction spot and a deflection system comprising for example two galvanometric mirrors 5 and 6 adapted to pivot about their respectives axes x and y under the action of motors 50 and 60 respectively in a plane perpendicular to the plane of the Figure and in the plane of the Figure. The motors 50 and 60 are controlled by a synchronisation system 27. This deflection system is provided for the adressing of the document 13 and of the cell 31 respectively by an analyzing and a recording spot, as will be seen hereinafter. It can realize a scanning, for example of the television type. A lens 10 causes the two beams to converge towards a dichroic mirror 11 selected in dependence upon the values of $\lambda_1$ and $\lambda_2$ to reflect the analysis beam 8 and to transmit the recording beam 2 (or vice versa). The beam 2 is focussed in the median plane of the material forming a layer 15 of liquid crystal having a smectic phase, for example of CBOA (cyanobenzylidene octyl aniline). The cell 31 consists of the layer 15, of which the thickness is about 15 $\mu$m, enclosed between two glass plates 16 and 17 on the inner surfaces of which are deposited two electrodes 32 and 33 (for example layers of mixed oxide of indium and tin having a thickness of 0.5 $\mu$m) which are transparent to the visible light and which are capable of absorbing a large part of the recording radiation in order locally to heat the layer 15 at the point of impact I of the beam 2 in said layer. The operating temperature of the cell is such that the liquid crystal is in its smectic phase in the absence of radiation. To this end, it may be necessary in the case of certain materials continuously to heat the cell to a constant temperature by means not shown, for example by a heating electrode associated with a thermistor. In order uniformly to orient the liquid crystal molecules in the absence of radiation, an adequate coating may be provided on the inner surfaces of the electrodes 32 and 33. The local heating of the layer produced at each instant by the beam 2 depends upon the intensity of the beam 2 at that instant. If this intensity is sufficient, the elementary volume of the material surrounding the point I passes from the smectic phase to the isotropic liquid phase. Since the beam 2 scans the layer by means of the two mirrors 5 and 6, this volume is then cooled more or less rapidly according to the duration of the radiation pulse, which results in a return to the smectic phase with a disorientation of the molecules which is greater, the more rapidly cooling has taken place, which renders the point I more or less diffusing. When the intensity of the beam 2 is inadequate, there is no change of phase and the point I remains transparent. During the irradiation of the cell at the point I, the analysis beam 8, which is reflected by the dichroic mirror 11 and optionally filtered by an interference filter 12 so as to eliminate any parasitic component emanating from the beam 2, is focussed on the document 13 to be analysed either directly (in which case the document 13 and the layer 15 are optically conjugated in relation to the mirror 11) or by way of an optical system 30. Disposed behind the document 13 is a detecting photocell 14 of which the function is to collect that fraction of energy of the beam 8 which is transmitted at each instant by the point of impact J of the beam 8 on the document. The photocell 14 provides an electrical signal S in dependence upon the energy received and, hence, upon the absorbing power of the point J. The signal S is delivered to a light modulator 3, for example an acousto-optical one, disposed in the path of the recording beam 2 between the source 1 and the plate 9. This modulator effects either an all-or-nothing modulation when the information contained in the signal S is of the digital type or a modulation of the duration of the light pulses emitted by the laser 1 which is converted into a variation of the diffusing power of the layer 15. Since the scanning of the layer by the beam 2 is synchronised with the scanning of the document by the analysis beam 8, the diffusion state of the layer 15 at the end of scanning exactly reproduces the transparency state of the document 13. This reproduction is on the 1:1 scale in the absence of an optical system between the mirror 11 and the document 13. It may be reduced (as shown in the Figure) or even enlarged by the use of an optical system 30.

It is possible to display the image reproduced in the layer 15 immediately after it has been recorded, or even later by virtue of the memory effect in a liquid crystal cell, by means of a projection system comprising a light source 18 which emits a beam 19, generally of white light, of which the wavelength spectrum corresponds to the reflection zone of the dichroic mirror 11. In addition, the electrodes 32 and 33 are selected to be transparent to the beam 19. The beam 19 is collimated by a lens 20 and reflected by the mirror 11 to illuminate the entire surface of the cell 31. After having passed through this cell and after having been diffused to a greater or lesser extent, the light is projected onto a surface 23 after passage through a projection lens 21 and a diaphragm 22. One particular ray 24 of the beam 19 has been shown, namely the ray which impinges on the cell at the point I referred to above. The ray 24 is diffused and produces a divergent beam 25. The diaphragm 22 is disposed in the focussing plane of the lens 21 so as to transmit only the non-diffused rays towards the surface 23. The greater the extent to which the point I is diffusing, the smaller will be the fraction of intensity of the ray 24 which is transmitted by the diaphragm and, hence, the darker will appear the point K of impact of this ray on the surface 23. Instead of using a diaphragm, it is possible to use a spatial filter which, by contrast, allows all the rays, except for the non-diffused ray, to pass through. In this case, the point K will appear more brightly, the greater the extent to which the point I is diffusing. The contrast is inverted and it is possible in this way to eliminate the noise which could emanate from projection rays diffused by the layer and from recording rays which are not absorbed by the layer and which would be reflected by the diaphragm and detected by the cell 14. Depending on the type of application envisaged, the surface 23 may be a screen or a photosensitive surface.

When the surface of the document 13 is relatively small, the photocell 14 remains fixed. It could also be displaced parallel to the document 13 in synchronism with one of the two scans. In that case, it is linked to a motor 28 synchronised by the system 27.

The projection lamp 18 emits a beam of white light which is generally not absorbed by the materials used for the layer 15. It is thus possible to use a very powerful lamp without disturbing the operation of the cell 31 by heating and to project the image reproduced by the cell onto a screen of large dimensions. A system for reproducing images on a large screen is obtained in this way. By using a photosensitive material instead of a screen, a photocopying system is obtained. The document 13 may be a sheet of paper, for example measuring 21 cm × 29,7 cm, which is reduced by the optical system 30. The document 13 may be also be a microfilm which is enlarged by another optical system 30 or any document which is transparent to the wavelength of the analysis beam. By virtue of the memory effect of the cell 31, it forms a facsimile of the analysed document which it can be useful to keep.

The invention is also applicable to the teletransmission of images. The signal S is applied to a transmission system 26 and is thus teletransmitted to an independent image-reproducing system, similar to the system described above or even different thereform, comprising synchronous scanning means. The possibility of simultaneously carrying out analysis and reproduction at the very place of the emission of the information signal S enables the quality of the transmitted images to be directly monitored and any corrections to be made either by completely repeating the analysis or by modifying only part of the image, the synchronisation system 27 enabling any point of the document 13 to be adressed by the analysis beam as required, and, at the same time, the corresponding point of the cell 31 to be adressed by the recording beam. In the case of smectics, local erasing can be obtained by various methods. The zone to be erased may be slowly scanned by the beam used for recording in non-modulated form. It is known that, if the layer 15 is slowly cooled, the material is uniformly oriented and becomes transparent again. Complete erasure may be obtained by uniformly heating the layer until the nematic phase or the isotropic phase is obtained, followed by slow cooling to the operating temperature. This heating may be obtained by passing a strong current through one or even both of the electrodes 31 and 32. When the images recorded on the liquid crystal have been completely erased, the cell can be used another time for other recording purposes.

Results similar to those obtained with smectic substances may be obtained with cholesteric crystals, for example with mixtures consisting of 90% of MBBA-EBBA and 10% of cholesteryl nonanoate. In the same way as smectic substances, these nematic-cholesteric mixtures are generally sensitive to infrared radiation and the YAG laser sources may readily be used for recording.

One interesting variant consists in using the effect obtained by applying an electrical field to a layer of certain smectic materials during its cooling. It is known that the application of an a.c. or d.c. electrical field perpendicular to the plane of the layer enables the disorder of the molecules to be controlled by contributing to the homeotropic orientation of certain materials. This is the case with liquid crystals of the biphenyl-nitrile family. When the applied field increases, a continuous transition is obtained between the completely diffusing state and the completely transparent state. In this case, the recording beam has to be of sufficient constant intensity for diffusion to be obtained in the absence of the field. The modulator 3 is left out. The signal S emitted by the cell 14 is delivered to an electronic system 29 which, between its two outputs A and B, supplies an electrical a.c. voltage which has an effective value suited to the constituent material of the layer 15 and which is formed by a high-frequency voltage amplitude-modulated by the signal S. The outputs A and B are respectively connected to the electrodes 32 and 33. In order to memorise the image recorded in the cell 31, the beam 2 has to be interrupted, and the field between the electrodes to be reduced to zero. To this purpose, the electrodes may be short-circuited by means of the system 29. The recorded image may be stored for several months at ambient temperature for the majority of smectic materials capable of being used in this way.

In order completely to erase the image, the beam 2 has to be interrupted, and a sufficiently high voltage (about 50 V at 1 KHz) to be applied between the electrodes. Selective erasure may be obtained by applying a voltage of about 15 volts between the electrodes. The point which it is desired to erase is addressed by the synchronisation system 27 and illuminated by a pulse of the beam 2 so as to bring the point into the nematic phase or the isotropic phase. The material in the nematic phase is oriented by the electrical field and retains its orientation during return to the smectic phase. The addressed point thus becomes transparent again. This method of erasure using the thermal effects combined with an electrical field is also applicable to the majority of smectic materials and may therefore be used in combination with the first recording method described above. Return to the transparent homeotropic state is promoted by the application of an adequate coating to the surfaces of the electrodes in contact with the layer 15, for example a monomolecular layer of silane.

By eliminating the modulation of the recording beam, the recording method described above enables the system to be simplified by using only one laser instead of two. In FIG. 2, which shows the layout of this variant, the same elements as in FIG. 1 are denoted by the same elements as in FIG. 1 are denoted by the same references. From FIG. 1, the laser 7 is suppressed, only the laser 1 is retained because the beam 2 which it delivers has a wavelength suita suitable for recording in the smectic layer. The beam 2 passes through the expander 4, is deflected by the deflectors 5 and 6 and is focussed by the lens 10 in the smectic layer 15 forming part of the cell 31 which is similar to that shown in FIG. 1. A plate 11 is arranged between the lens 10 and the cell 31, being selected to transmit almost all the beam 2 and to reflect the projection light, i.e. in general the visible rays. Since a plate such as this cannot be perfect, a constant small fraction of the recording beam is always reflected and forms a beam 80 of low intensity which is sufficient for the analysis of the document 13. A reflection coefficient of 1% is generally sufficient for analysis providing the document 13 is transparent to the wavelength of the beam 80, i.e. to infrared radiation, which is generally the case. Behind the document 13 are disposed a filter 120, which allows the beam 80 through and absorbs the parasitic components, if any, emanating from the projection light, and the cell 14 which is electrically connected to the signal processing unit 29. The voltage supplied by this unit is applied to the two electrodes 32 and 33. The projection system is similar to that shown in FIG. 1. The beam 19 is not shown. The diaphragm 22 is replaced by a spatial filter 220 arranged in the focal plane of the lens 21 which allows all the rays diffused by the layer 15 to pass through and stops the non-diffused rays.

What we claim is:

1. A system for reproducing monochromic images carried by a support; said system comprising:
    a liquid crystal cell comprising a layer of a material having a smectic phase; said layer being enclosed between two electrodes and maintained in said smectic phase;
    only one radiation source providing a single beam;
    optical means, disposed on the path of said beam, for producing from said beam an analyzing light spot on said support and a recording light spot in said liquid crystal cell; at least one of said electrodes being transparent for the wavelength of said beam;
    deflecting means, inserted in said path between said radiation source and said optical means, for the scanning of said support by said analyzing spot and the synchronous scanning of said liquid crystal cell by said recording spot;
    photodetecting means, for collecting the light emerging from said support and providing an electrical signal representative of said images;
    electronic means, receiving said electrical signal and supplying an electrical field between said two electrodes, for controlling the diffusing power of said layer; said diffusing power being created by a local heating of said liquid crystal induced by said recording spot.

2. A system as claimed in claim 1, wherein said optical means comprise reflecting means, having a reflection coefficient different from 1 and from 0, for the separation of said beam into a recording beam and an analyzing beam.

3. A system as claimed in claim 2, wherein said optical means further comprise focussing means, inserted between said deflecting means and said reflecting means, for focussing said recording beam into said recording spot and said analyzing beam into said analyzing spot.

4. A system as claimed in claim 3, wherein said optical means further comprise an optical system situated in the path of one of said recording and analyzing beams and making a difference of scale between the images carried by said support and the images recorded in said liquid crystal cell.

5. A system as claimed in claim 1, further comprising optical projection means for projecting the images recorded in said liquid crystal cell onto a flat surface.

6. A system as in claim 1 wherein said single beam is unmodulated whereby said recording light spot has constant intensity.

* * * * *